United States Patent [19]

Straehle et al.

[11] Patent Number: 4,507,475
[45] Date of Patent: Mar. 26, 1985

[54] PROCESS FOR PURIFICATION OF CRUDE POLYETHER POLYOLS

[75] Inventors: Wolfgang Straehle, Heidelberg; Raymond Denni, Wachenheim; Matthias Marx, Bad Durkheim, all of Fed. Rep. of Germany

[73] Assignee: BASF Aktiengesellschaft, Fed. Rep. of Germany

[21] Appl. No.: 516,330

[22] Filed: Jul. 22, 1983

[30] Foreign Application Priority Data

Aug. 5, 1982 [DE] Fed. Rep. of Germany ....... 3229216

[51] Int. Cl.$^3$ ..................... C07H 15/04; C07C 41/34
[52] U.S. Cl. .................... 536/120; 536/127; 536/126; 560/79; 560/191; 564/310; 564/334; 564/437; 564/438; 564/464; 564/475; 564/497; 564/498; 568/618; 568/619; 568/620; 568/621
[58] Field of Search ............. 568/621, 618, 619, 620; 560/79, 191; 536/120, 126, 127; 564/310, 334, 437, 438, 464, 475, 497, 498

[56] References Cited

U.S. PATENT DOCUMENTS 4,306,943  12/1981  Mori et al. ..................... 568/621

FOREIGN PATENT DOCUMENTS 56-61428  5/1981  Japan ......................... 568/621
197158    5/1967  U.S.S.R. ..................... 568/621

Primary Examiner—Howard T. Mars
Attorney, Agent, or Firm—Norbert M. Lisicki

[57] ABSTRACT

A process for purifying crude polyether polyols which are prepared by anionic polymerization of alkylene oxides in the presence of basic catalysts. The polyols are mixed with water and ortho-phosphoric acid in certain quantity ratios, an adsorption agent is incorporated in the reaction mixture, the mixture is filtered and the water is removed from the polyether polyol by distillation.

9 Claims, No Drawings

PROCESS FOR PURIFICATION OF CRUDE POLYETHER POLYOLS

BACKGROUND OF THE INVENTION

1. Field of the Invention

This invention relates to the purification of crude polyether polyols. More specifically, this invention relates to the purification of crude polyether polyols containing alkaline catalysts by treatment with water, ortho-phosphoric acid, and an adsorption agent followed by filtration of the salts.

2. Prior Art

Polyether polyols are commonly prepared by anionic polymerization of alkylene oxides. The alkylene oxides in the presence of basic catalysts such as alkali metal hydroxides or alcoholates are added to a starter molecule which contains at least two reactive hydrogen atoms in bonded form. This results in polyether polyols with free hydroxyl groups, part of which carry alcoholate groups in the terminal position as a result of the alkaline reaction medium. For the further use of the polyether polyol, particularly for the preparation of polyurethanes, the alcoholate radicals must be transformed into free hydroxyl groups in such a manner that the polyether polyols essentially do not contain any inorganic components which can be detected by ashing or showing a buffer effect.

The alkali-containing polyether polyols are, therefore, generally neutralized with inorganic or organic acids resulting in emulsions of aqueous salt solutions and polyether polyols. Subsequently, the water of the emulsions is removed by stripping under vacuum. The remaining salts which precipitate in the polyether polyol are separated by mechanical means.

If inorganic acids such as sulfuric acid, phosphoric acid, hydrochloric acid, or salts that react in an acid manner, such as potassium hydrogen phosphate, or organic acids such as citric acid, tartronic acid and others are used for the neutralization, the neutralization must be carried out exactly to the equivalency point in order to obtain a minimum of basic residual alkali salts on the one hand or a minimum acid excess on the other hand (U.S. Pat. No. 3,425,960). Furthermore, the alkali salt is frequently precipitated in such fine crystals that the filtration causes difficulties in spite of using filtration aids. Furthermore, discoloration of the polyether polyols may occur, particularly when using sulfuric acid.

The difficulty of having to set the equivalency point for the neutralization in such an exacting manner can be eliminated according to U.S. Pat. No. 3,016,404 by using a volatile acid such as hydrogen chloride. The excess hydrogen chloride is removed as a gas by means of distillation. The drawback of this method is that the hydrogen chloride has a strongly corroding effect on the vessel material and that the excess gas must be separated or destroyed by means of costly absorption and scrubbing towers in order to avoid air contamination.

Satisfactory results are obtained if alkylene oxides are polymerized with basic catalysts and if the catalysts are subsequently precipitated with carbon dioxide in the presence of basic magnesium salts. This procedure is described in German Pat. No. 22 08 614 (U.S. Pat. No. 3,833,669).

Methods which use ion exchange for neutralizing the reaction solution are also expensive as far as equipment and the use of auxiliaries are concerned. In this case, the work must be conducted in the presence of diluting agents which must subsequently be separated and regenerated. In order to avoid high product losses, the ion exchangers must be washed until completely free of product prior to regeneration.

According to British Pat. No. 877 269, acid treated minerals are used for neutralizing the polyether polyols. A drawback of this method is the handling of solids which can present difficulties, particularly as far as larger reaction batches are concerned since approximately 4 weight percent of such minerals based on the polyether polyol weight are required for the neutralization process. In order to obtain a clear filtrate, a very dense filter material must be used for filtering such minerals which again results in long filtration periods.

For purifying the polyether polyols, the reaction mixture according to U.S. Pat. No. 3,582,491 is diluted with a water insoluble solvent such as toluene or hexane and the resultant solution is washed with water. However, the process is costly with respect to equipment and is further costly as a result of the subsequent solvent regeneration. The easy formation of emulsions presents another problem.

According to Published Application EP-OS 944, the crude polyether polyols are mixed with water, an adsorption agent and a solvent and the reaction mixture is subsequently filtered. The use of an adsorption agent is basically without problem but does have the drawback that the polyether polyol yield as a function of the applied amount of adsorption agent is reduced, for example, by 2 to 5 percent. In addition to this, the pyrophoric filter residue must be disposed of. This process step not only represents a safety risk but it is just as technically expensive and environmentally unsound as the solvent reclamation.

The purification of polyether polyols is also described in U.S. Pat. No. 4,306,943. According to this process, the reaction mixture is neutralized with a mineral acid having a dissociation constant greater than $10^{-3}$ at 25° C. and is mixed with the hydrate of a metal salt of the applied acid. Following this process, the water is removed by distillation and the reaction mixture is filtered. A particular drawback of this method is the fact that the metal salt hydrates must be prepared in a separate process step, that the amount of filtration residue is increased by this addition and that the filtration time is extended.

For the above-mentioned reasons, it was heretofore in many cases not feasible to prepare polyether polyols according to known methods in high time space yields which are also nearly ash free, colorless and odorless without extensive after-treatment of the products.

The present invention facilitates elimination of these drawbacks. In a technically simple process, by precipitating the basic polymerization catalysts with ortho-phosphoric acid and treatment of the reaction mixture with adsorption agents and optionally filtering auxiliaries, exactly reproducible polyether polyols can be produced displaying an improved acid number, reduced ash content and with a partially improved or at least not significantly reduced filtration rate.

DESCRIPTION OF THE PREFERRED EMBODIMENTS

The invention thus relates to a process for the purification of crude polyether polyols obtained by anionic polymerization of alkylene oxides in the presence of basic catalysts and subsequent neutralization of the catalysts with mineral acid wherein (a) the crude polyether polyol is mixed with 0.2 to 1.5 parts by weight of water per 100 parts by weight of crude polyether polyol and 0.3 to 1.1 moles of ortho-phosphoric acid per mole of basic catalyst, (b) 0.05 to 0.5 part by weight of an adsorption agent are incorporated in the reaction mixture per 100 parts by weight of crude polyether polyol, (c) the resultant salts and the incorporated solid additives are separated and (d) the water is removed from the polyether polyol by stripping.

It was surprising and not at all foreseeable that polyether polyols can be quickly and reliably purified in the simplest manner according to the method of this invention since it was known from U.S. Pat. No. 3,016,404 that sirupy phosphoric acid is absolutely unsuited for neutralizing crude alkylene oxide polyether polyols. The potassium ions could be completely precipitated only when phosphoric acid-potassium ion-equivalency ratios of at least 3.0 are used. However, this resulted in polyoxyalkylene polyols with high acid numbers.

By the combined neutralization/adsorption method wherein a small amount of ortho-phosphoric acid is combined with a small amount of the adsorption agent, it was possible to achieve definitely better analytical results when compared to the mineral acid or the adsorption agent used separately. Furthermore, the water content of the crude polyether polyol is of decisive importance for the quality of the purification.

Thus, the process of this invention results in polyether polyols which meet specifications in greater yields with a reduced amount of filter residue and in acceptable filtration times compared with conventional adsorption methods.

The polyether polyols are prepared in accordance with well known procedures. One or more optionally substituted alkylene oxides with 2 to 4 carbon atoms in the alkylene radical are added to a starter molecule which contains at least 2, preferably 2 to 8, and particularly 2 to 4 active hydrogen atoms in the presence of a basic catalyst.

Suitable alkylene oxides include 2,3-epoxypropanol-1, 1,2- and/or 2,3-butylene oxide, styrene oxide and preferably ethylene oxide and 1,2-propylene oxide. The alkylene oxides may be used individually, alternatingly in sequence or as mixtures.

Suitable starter molecules include, for example: water, organic dicarboxylic acids such as succinic acid, adipic acid, phthalic acid and terephthalic acid, aliphatic and aromatic optionally N-mono-, N,N- and N,N'-dialkyl substituted diamines with 1 to 4 carbon atoms in the alkyl radical such as optionally mono- and dialkyl substituted ethylenediamine, diethylenetriamine, triethylenetetramine, 1,3-propylenediamine, 1,3- and/or 1,4-butylenediamine, 1,2-, 1,3-, 1,4-, 1,5- and 1,6-hexamethylenediamine, phenylenediamine, 2,4- and 2,6-toluenediamine, 4,4'-, 2,4- and 2,2'-diaminodiphenylmethane and mixtures of diaminodiphenylmethanes and polyphenylene polymethylene polyamines.

Other suitable starter molecules include alkanolamines such as ethanolamine, diethanolamine, N-methyl- and N-ethyl alkanolamines such as N-methyl- and N-ethyl-diethanolamine and triethanolamine, ammonia, hydrazine and hydrazides. Preferably used are multifunctional, particularly bi- and/or trifunctional, glycols such as ethylene glycol, 1,2-propylene glycol and trimethylene glycol, diethylene glycol, dipropylene glycol, 1,4-butanediol, 1,6-hexamethylene glycol, glycerine, trimethylolpropane, pentaerythritol, sorbitol and sucrose. The starter molecules may be used individually or as mixtures.

Commonly used catalysts are alkali alkoxides with 1 to 4 carbon atoms in the alkyl radical such as sodium methylate, sodium and potassium ethylate, potassium isopropylate and sodium butylate and preferably alkali hydroxides such as sodium hydroxide and preferably potassium hydroxide. The catalyst is normally used in an amount of 0.02 to 3 weight percent, preferably of 0.2 to 1.0 weight percent, based on the overall weight of the starting components.

According to the invention, the basic catalyst is neutralized with ortho-phosphoric acid in the presence of a defined amount of water. Suitable for this purpose are anhydrous as well as commercially available aqueous orthophosphoric acids if the listed quantity ratios are maintained. Preferably used is sirupy (85 weight percent) ortho-phosphoric acid.

The crude polyether polyol is mixed with 0.2 to 1.5 parts by weight of water per 100 parts of polyol, preferably 0.4 to 1.2 parts of water and, more preferably, 0.5 to 1.0 part by weight of water. The amount of orthphosphoric acid employed is from 0.3 to 1.1 mole of phosphoric acid per mole of alkaline catalyst, preferably 0.6 to 1.0 mole of acid with the pH of the mixture ranging from 12 to 5, preferably 9 to 6.

Preferably used as the adsorption agent are natural and synthetic silicas of earth alkali metals and/or aluminum. Examples include aluminum silicates such as bentonite, calcium silicates such as montmorillonite and magnesium silicates such as talc.

A synthetic magnesium silicate with the assumed formula $MgO(SiO_2)_{2,7}$ has proven to work particularly well and is, therefore, used on a preferred basis. The adsorption agents are used in amounts of 0.05 to 0.5 part by weight, preferably of 0.1 to 0.2 part by weight per 100 parts by weight of crude polyether polyol.

The salts formed by the neutralization and the adsorption agents incorporated in the reaction mixture may be easily separated by sedimentation, centrifuging and, preferably, by filtration. It has proven to be advantageous to use filtration aids such as perlite, Kieselguhr and diatomaceous earths for the filtration in addition to the adsorption agents. If filtration aids are used, they are normally applied in amounts of 0.05 to 1.0 part by weight, preferably 0.1 to 2.0 part by weight per 100 parts by weight of crude polyether polyol.

The polyether polyols are advantageously prepared in such a manner that a mixture consisting of starter molecule and basic catalyst is introduced at temperatures of 60° C. to 150° C., preferably 90° C. to 130° C., and the alkylene oxide which may optionally be diluted with a gas inert under the reaction conditions such as nitrogen is introduced in the amount desired, for example, in 2 to 12 hours, preferably 6 to 10 hours, under atmospheric pressure or optionally under increased pressure at 1 to 20 bar, preferably 1 to 8 bar.

After completing the polymerization, the excess alkylene oxide is removed by stripping at temperatures of 90° C. to 150° C. under reduced pressure, for example, at 5 to 50 mbar. The water and the ortho-phosphoric acid are added to the crude polyether polyol at a temperature of 50° C. to 140° C., preferably of 70° C. to 120° C., and more preferably at 85° C. to 100° C. at atmospheric pressure or optionally under increased pressure up to 6 bar. According to the preferred mode of operation, the water is initially added to the crude polyether polyol followed by the phosphoric acid. However, it is also possible to add the water and the phosphoric acid simultaneously or to initially add the phosphoric acid and then the water to the crude polyether polyol. The reaction mixture is stirred within the mentioned temperature ranges for a period of 0.1 to 4 hours, preferably 0.5 to 1 hour, and the adsorption agent is subsequently incorporated while the mixture is stirred. It has proven to be advantageous to stir the mixture for another 0.5 to 5 hours, preferably 1 to 2 hours, after adding the adsorption agent. The reaction vessel is now optionally depressurized, a filtering aid is advantageously added to the reaction mixture, the mixture is optionally stirred for another 0.1 to 2 hours, and the resultant salts and the solid additives such as the adsorption and optionally the filtration agents are removed by means of filtration using a glass filter, a membrane filter or preferably metal filters having a mesh of 40 to 100 microns either without pressure or preferably under a pressure of 0.5 to 6 bars. In order to achieve a high filtration rate and good catalyst removal, it is essential that the water content of the reaction mixture remains basically unchanged during the neutralization and advantageously also during the filtration. As a final step, the water is removed from the polyether polyol produced as filtrate by means of stripping at a temperature of 90° C. to 130° C. under a reduced pressure of 5 to 50 mbar.

The polyether polyols purified according to the process of this invention are preferably used for the preparation of polyurethane plastics. The products have functionalities of at least 2, hydroxyl numbers of 15 to 1000 and viscosities of 100 to 350,000 m.Pas at 25° C.

The following Examples are intended to exemplify the invention.

EXAMPLES

Preparation of the Polyether Polyols

Polyether Polyol 1

An amount of 92.09 grams of glycerine was placed in a 10 liter stirred autoclave. After adding 21.3 grams of 85 percent by weight aqueous potassium hydroxide solution, the mixture was heated to 100° C. for two hours and the water resultant from the alcoholate formation and used as solvent was removed by stripping under reduced pressure (10 mbar). Subsequently 5100 grams of 1,2-propylene oxide were added at 105° C. while the mixture was being stirred at such a rate that the overall pressure in the agitator autoclave did not exceed 7 bar. After propoxylation was completed, any unreacted 1,2-propylene oxide was removed by stripping under reduced pressure (10 mbar). The product was then oxyethylated with 1370 grams of ethylene oxide under the above-described reaction conditions. Following this step, unreacted ethylene oxide was removed by stripping under reduced pressure (10 mbar).

Polyether Polyol 2

The procedure described for polyether polyol 1 was employed but the starting components were used in the following amounts: 138.1 grams glycerine, 44.1 grams 85 percent aqueous potassium hydroxide solution, 6180 grams 1,2-propylene oxide, and 1170 grams ethylene oxide.

Polyether Polyol 3

An amount of 92 grams of glycerine was placed in a five-liter stirred autoclave and after adding 10.4 grams of 85 weight percent aqueous potassium hydroxide solution, the mixture was heated to 105° C. for two hours and the water was removed by stripping under reduced pressure (10 mbar). Subsequently, a mixture of 625 grams of ethylene oxide and 3280 grams of 1,2-propylene oxide was added at 105° C. while being stirred at such a rate that the overall pressure in the agitator autoclave did not exceed 7 bar. After a post reaction time of four hours, the unreacted alkylene oxides were removed by stripping under reduced pressure (10 mbar).

Polyether Polyol 4

A mixture of 410 grams sucrose, 73.6 grams glycerine, 25 grams of water and 4.2 grams of 85 weight percent aqueous potassium hydroxide solution was placed in a five-liter stirred autoclave and 1150 grams of 1,2-propylene oxide were subsequently added at 115° C. while being stirred in such a manner that the overall pressure in the agitator autoclave did not exceed 7 bar. After the propoxylation, unreacted 1,2-propylene oxide was removed by stripping under reduced pressure (10 mbars).

Polyether Polyol 5

An amount of 520 grams of a 70 weight percent aqueous sorbitol solution and 3 grams 85 weight percent aqueous potassium hydroxide solution were placed in a five-liter stirred autoclave and the water was subsequently removed by stripping under reduced pressure (10 mbar) at 105° C. in four hours. Subsequently 850 grams of 1,2-propylene oxide were added at 105° C. while the mixture was being stirred and in such a manner that the overall pressure in the agitator autoclave did not exceed 7 bar. After complete reaction of the 1,2-propylene oxide, the volatile components were removed by stripping at 110° C. under a pressure of 10 mbar for a period of one hour.

EXAMPLES 1-5

General purification instructions

While being stirred, water and subsequently 85 weight percent aqueous (sirupy) phosphoric acid was added to the crude polyether polyols of Examples 1-5 at 90° C. The reaction mixture was stirred at 90° C. for one hour and was mixed with a commercially available synthetic magnesium silicate. After an additional agitation period of one hour, a filtering aid based on Kieselguhr was added. The mixture was filtered through a metal filter having a mesh of 80 microns under a pressure of 4 bar and a temperature of 90° C. and the water was removed by stripping under a pressure of 5 mbar.

COMPARISON EXAMPLES 1A-5A

General purification instructions

Added to the crude polyether polyols of Examples 1-5 was water and subsequently 85 weight percent aqueous phosphoric acid at 90° C. while stirring the mixture. After an agitation period of one hour, a filtration aid based on Kieselguhr was stirred in and the mixture was filtered and the water was removed by stripping in accordance with the procedure of Examples 1-5.

COMPARISON EXAMPLES 1B–5B AND 1C–5C

General purification instructions

While being stirred, water and subsequently synthetic magnesium silicate and a filtration aid (Kieselguhr) were added to the crude polyether polyol which had been cooled to 90° C. After an agitation period of one hour at 90° C., the mixture was filtered and the water was removed by distillation under reduced pressure in accordance with the data of Examples 1–5.

The amounts of 85 weight percent aqueous phosphoric acid, synthetic magnesium silicate, Kielselguhr and water employed and the resultant analytical data, the filtration rate and the amount of filter residue are summarized in the following table.

The results show that the polyether polyol properties, pH value and sodium and potassium ion content, the filtration rate and the low filter residue combined with high polyether polyol yield can be optimally adjusted to each other only in accordance with the process of this invention.

The embodiments of the invention in which an exclusive privilege or property is claimed are defined as follows:

1. A process for the purification of crude polyether polyols prepared by anionic polymerization of alkylene oxides in the presence of basic catalysts and subsequent neutralization of the catalysts with mineral acid wherein the (a) crude polyether polyol is mixed with 0.2 to 1.5 parts by weight of water per 100 parts by weight of crude polyether polyol, and 0.3 to 1.1 moles of ortho-phosphoric acid per mole of alkaline catalyst, (b) 0.05 to 0.5 parts by weight of an adsorption agent per 100 parts by weight of crude polyether polyol are subsequently incorporated in the reaction mixture, (c) the resultant salts and solid additives are separated, and (d) the water is removed from the polyether polyol.

2. The process of claim 1 wherein the crude polyether polyol is mixed with water and phosphoric acid at temperatures of 50° C. to 140° C. and optionally under increased pressure.

3. The process of claim 1 wherein the reaction mixture of polyether polyol, water and phosphoric acid is agitated at temperatures of 50° C. to 140° C. for 0.1 to 4 hours and the adsorption agent is subsequently incorporated in the reaction mixture.

TABLE I

|  | Example 1 | Comparison Example 1A | Comparison Example 1B | Comparison Example 1C | Example 2 | Comparison Example 2A | Comparison Example 2B | Comparison Example 2C |
|---|---|---|---|---|---|---|---|---|
| Crude polyether polyol | 1 | 1 | 1 | 1 | 2 | 2 | 2 | 2 |
| 85 weight percent aqueous phosphoric acid (g/kg crude polyether polyol) | 5.67 | 5.67 | — | — | 10.3 | 10.3 | — | — |
| 85 weight percent aqueous phosphoric acid (mole/mole KOH) | 1 | 1 | — | — | 1.0 | 1.0 | — | — |
| Synthetic magnesium silicate (percent by weight) | 0.2 | — | 0.2 | 2.0 | 0.2 | — | 0.2 | 2.0 |
| Filtration aid (% by wt.) (Kieselguhr) | 0.2 | 0.2 | 0.2 | 0.2 | 0.2 | 0.2 | 0.2 | 0.2 |
| Water (percent by weight) | 1.0 | 1.0 | 1.0 | 1.0 | 0.5 | 0.5 | 0.5 | 0.5 |
| Purified polyether polyol | | | | | | | | |
| Hydroxyl number | 26 | 26 | 27 | 26 | 35 | 35 | 35 | 35 |
| Acid number | 0.05 | 0.11 | — | 0.05 | 0.05 | — | 0 | 0.03 |
| Primary hydroxyl groups (%) | 82 | 83 | 82 | 82 | 80 | 80 | 81 | 79 |
| pH value | 6.85 | 10.35 | 11.41 | 7.38 | 6.74 | — | 12.32 | 7.36 |
| Sodium—/Potassium ion content (ppm) | 1/1 | 7/510 | 5/420 | 5/15 | 1/1 | 9/165 | 15/1300 | 1/21 |
| Filtration rate (grams/minute) | 41 | 140 | 148 | 15.5 | 30 | 0.08 | 96 | 22 |
| Filtration residue (% by wt.) | 2.1 | 1.12 | 1.01 | 3.5 | 1.9 | — | 1.03 | 4.6 |

TABLE II

|  | Example 3 | Comp. 3A | Comp. 3B | Comp. 3C | Example 4 | Comp. 4A | Comp. 4B | Comp. 4C | Example 5 | Comp. 5A | Comp. 5B | Comp. 5C |
|---|---|---|---|---|---|---|---|---|---|---|---|---|
| Crude polyether polyol: | 3 | 3 | 3 | 3 | 4 | 4 | 4 | 4 | 5 | 5 | 5 | 5 |
| 85 weight percent aqueous phosphoric acid (g/kg crude polyether polyol) | 4.54 | 4.54 | — | — | 1.45 | 1.45 | — | — | 1.72 | 1.72 | — | — |
| 85 weight percent aqueous phosphoric acid (mole/mole KOH) | 1 | 1 | — | — | 0.33 | 0.33 | — | — | 0.33 | 0.33 | — | — |
| Magnesium silicate (percent by weight) | 0.2 | — | 0.2 | 1.7 | 0.2 | — | 0.2 | 2.0 | 0.2 | — | 0.2 | 2.0 |
| Filtration aid (percent by weight) (Kieselguhr) | 0.2 | 0.2 | 0.2 | 0.2 | 0.1 | 0.1 | 0.2 | 0.2 | 0.2 | 0.2 | 0.2 | 0.2 |
| Water (percent by weight) | 1.0 | 1.0 | 1.0 | 1.0 | 0.5 | 0.5 | 0.5 | 0.5 | 1.0 | 1.0 | 1.0 | 1.0 |
| Purified polyether polyol: | | | | | | | | | | | | |
| Hydroxyl number | 42 | 42 | 41 | 42 | 400 | 398 | 400 | 400 | 490 | 485 | 485 | 490 |
| Acid number | 0.07 | 0.28 | 0.01 | 0.07 | 0.02 | 0.04 | 0 | 0.01 | 0.04 | 0.02 | 0 | 0.02 |
| pH value | 6.5 | 5.81 | 9.37 | 7.05 | 7.06 | 11.1 | 11.48 | 8.5 | 7.3 | 8.03 | 10.83 | 8.12 |
| Sodium—/Potassium ion content (ppm) | 1/1 | 2/19 | 2/180 | 3/4 | 1/54 | 6/695 | 3/545 | 1/60 | 3/48 | 3/173 | 12/450 | 13/5 |
| Filtration rate (grams/minute) | 250 | 317 | 98 | 45 | 100 | 50 | 143 | 14 | 31 | 38 | 96 | 20 |
| Filtration residue (percent by weight) | 1.6 | 1.6 | 1.0 | 3.5 | 1.2 | 1.2 | 0.93 | 3.5 | 1.0 | 0.9 | 1.0 | 4.0 |

4. The process of claim 1 wherein magnesium silicate is used as adsorption agent.

5. The process of claim 1 wherein the resultant salts and incorporated solid additives are separated by filtration.

6. The process of claim 1 wherein the filtration is carried out in the presence of a filtering aid.

7. The process of claim 1 wherein substituted alkylene oxides with 2 to 4 carbon atoms in the alkylene radical are used for the polymerization.

8. The process of claim 7 wherein ethylene oxide and/or propylene oxide are used as the alkylene oxides.

9. The process of claim 1 wherein alkali hydroxides are used as the alkaline catalysts.

* * * * *